United States Patent Office 3,482,501
Patented Dec. 9, 1969

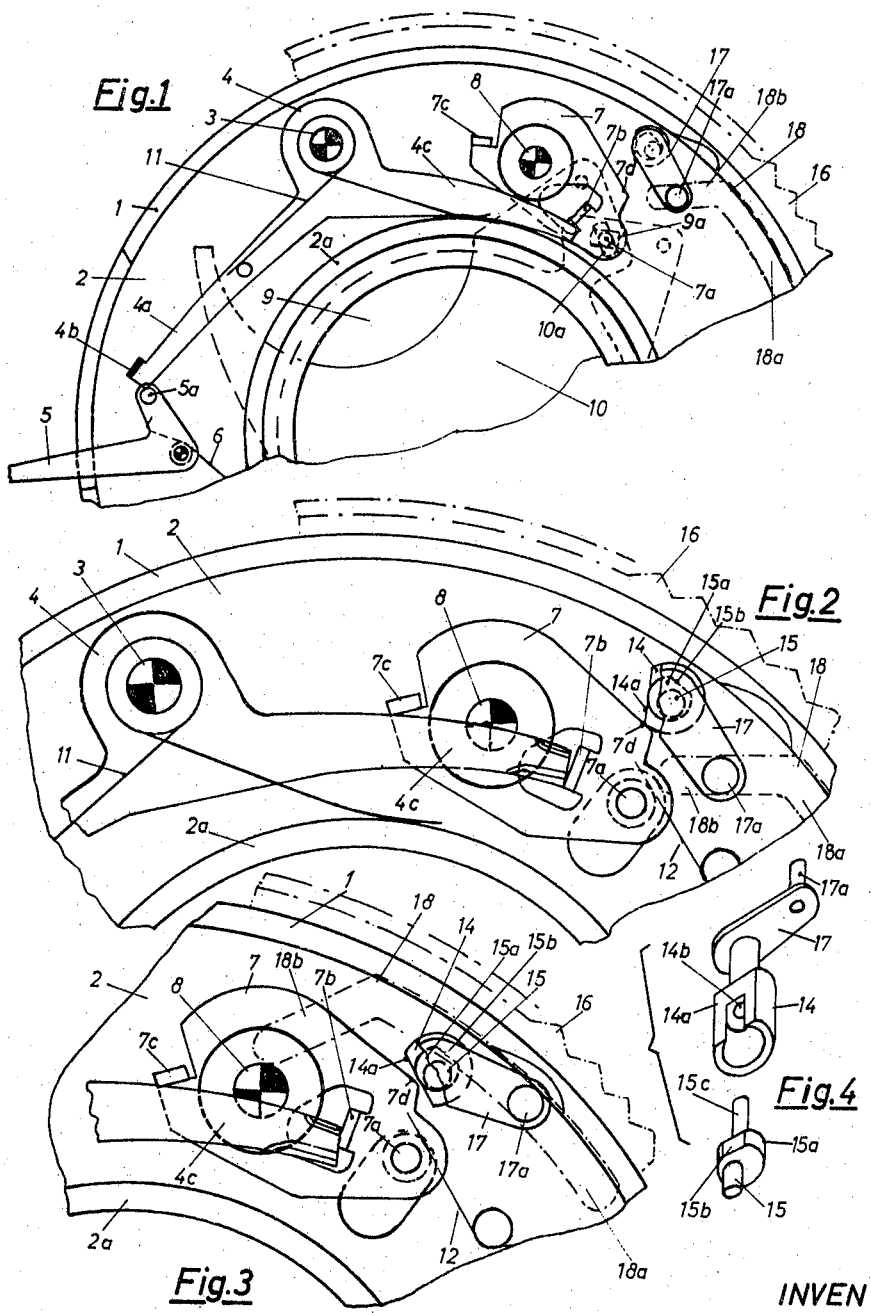

3,482,501
PHOTOGRAPHIC SHUTTER WITH RECIPROCATING SHUTTER BLADES
Karl Helber and Richard Wurster, Calmbach, Germany, assignors to Prontor-Werk Alfred Gauthier G.m.b.H., Calmbach, Black Forest, Germany, a German body corporate
Filed Apr. 15, 1966, Ser. No. 542,858
Claims priority, application Germany, Apr. 17, 1965, P 36,564
Int. Cl. G03b 9/14, 9/10
U.S. Cl. 95—63    3 Claims

ABSTRACT OF THE DISCLOSURE

A photographic shutter having blades which execute reciprocating motion during exposure and which are driven by an actuating member. A stop is provided on the shutter base which has operating and non-operating positions. An exposure time setting member moves the stop into or out of the operating position. The blade actuating member is so located as to have its reverse motion aided by the stop when the latter is in its operating position.

---

The invention concerns a photographic shutter the blades of which execute a reciprocating movement during exposure and are moved by means of an actuating member, reverse acceleration of the shutter blades after opening being assisted by a stop.

In shutters of the above kind, with an actuating member which drives the shutter blades for extremely short exposures and which co-operates with a stop brought into its movement path to accelerate the reversal of the blades, it has been found, especially in mass-produced shutters, that the extremely short exposure times aimed at cannot uniformly be obtained owing to the tolerances necessarily adopted during manufacture of the individual components of the shutter. Thus, inspection after assembly of the shutters repeatedly shows noticeable short exposure time errors, the stop being always responsible for at least a part of these errors.

It is the object of the invention to eliminate this inherent deficiency of these known shutter arrangements, i.e. to provide a shutter fitted with a stop which enables deviations in exposure timing caused by the tolerance of the individual components to be compensated.

This object is obtained in accordance with the invention by mounting a stop on a carrier the position of which can be varied. This permits a subsequent adjustment of the stop, by means of which the tolerances of the individual components, unavoidable for manufacturing reasons, may be compensated, so that even with mass-produced shutters it can be guaranteed that each individual shutter can have its exposure timing accurately set with the stop.

A simple construction taking manufacturing and functional requirements fully into account may be obtained in accordance with a further feature of the invention by an eccentric pin used as carrier for the stop, and arranged so as to be adjustable on the base plate of the shutter.

To enable this pin, riveted to the base plate of the shutter, to be adjusted after assembly by simple readily actuated means, it is provided with a collar serving to receive the stop and to form thereon a spanner surface permitting adjustment of the pin. In such a construction of the eccentric pin an operator entrusted with adjustment of the stop uses a spanner. The latter takes over the function of the stop during the inspection and adjustment operation and at the end of this operation the spanner is removed from the pin, whereupon the real stop is used to replace the spanner in the shutter.

A stop particularly suitable from a manufacturing point of view is bell-shaped and has a cylindrical jacket provided with a flat peripheral surface, and with a radially extending setting lever, the free end of which is moved by a control cam of the exposure setting member. The invention is described below in connection with a self-cocking shutter shown only in part.

Reference should now be made to the accompanying drawings, in which:

FIG. 1 shows the shutter at the end of the cocking operation in plan, with the parts which serve to drive the shutter blades and the stop brought into an operating position;

FIG. 2 is a partial illustration of the arrangement of FIG. 1 on a larger scale, at the instant at which the actuating member of the shutter blades strikes against the stop;

FIG. 3 shows the member driving the shutter blades in the same manner as in FIG. 2, but with the stop disengaged;

FIG. 4 shows the stop fitted with an adjusting lever, with the eccentric pin serving as bearing, in an exploded perspective view.

As seen from the drawings, a base plate 2 is fixed in the shutter housing 1, the plate having a lens mounting ring 2a. On the base plate 2, mounted so as to be rotatable by means of a bearing pin 3, is a two-armed lever 4, the arm 4a of which is associated with a cocking and release lever 5 also mounted on the base plate 2 so as to be movable. The arm 4a of the driving lever 4 has a projection 4b inclined downward out of the drawing plane, over which projection the pin 5a slides after the shutter action, when the lever 5 is released, being biased by a return spring 6, to re-engage the arm. The driving lever 4 co-operates by means of the other arm 4c with a shutter blade actuating lever 7, which in turn is rotatably mounted on a pin 8 fixedly mounted in the base plate 2. The lever 7 serves to move two shutter blades 9 and 10 between open and closed positions, for which purpose this lever has a driver pin 7a which is passed through a recess machined in the base plate 2 and engages in slots 9a and 10a of the shutter blades.

Concerning the co-operation of driving lever 4 and shutter actuating lever 7, the latter is provided with a bent-over bevelled flat 7b behind which at the end of the cocking movement, as seen from FIG. 1, the arm 4c of the driving lever 4 engages. If the cocking and release lever 5 is moved progressively anti-clockwise beyond the end phase of the cocking movement, then the pin 5a on the arm 4a of the driving lever 4 becomes disengaged. Biased by a driving spring 11 the driving lever 4 is now swung anti-clockwise, moving the shutter blade actuating lever 7 in the same direction of rotation into the position shown in FIG. 2, in which the shutter blades 9 and 10 assume the opened position. On attaining this position the arm 4c on the flap 7b of the shutter blade actuating lever 7 is disengaged and strikes against a further flap 7c of this lever. The lever 7 is thereby returned into the original position, the shutter blades 9 and 10 returning to the closed position. The closing movement of the shutter blade actuating lever 7 is assisted by a closing spring 12 (FIG. 3) which engages with the driving pin 7a and retains the shutter blades 9 and 10 in the closed position of the shutter.

In order to obtain at least one extremely short exposure time with the above shutter arrangement and without changing the driving force, a stop described in detail hereinafter is arranged on the base plate 2, which stop, by suitable shaping and change of position, either enters or does not enter the path of the shutter blade actuating lever 7. As evident from FIG. 4, this stop is bell-shaped and is formed as a partially cylindrical jacket 14 mounted on an adjustable support, this support being an eccentric pin 15 riveted in the base plate 2 and tightly held therein by friction. A section 14a of the outer periphery of the cylinder jacket 14 is removed by milling, the jacket being so located with regard to the movement range of the shutter blade actuating lever 7 that the latter strikes the cylinder 14 at reversal of the shutter blades when the exposure time setting member 16 has been set to an extremely short exposure time; for the remaining exposure times controlled by an escapement, the lever 7 moves past the flat part 14a of the cylinder 14.

A setting lever 17 for the stop 14 is secured to the cylinder jacket, which lever supports a driving pin 17a on its free end. This pin in turn engages in a control cam 18 provided on the exposure time setting member 16 of the shutter. This cam has a track which is cylindrical at 18a and inclined relative to the optical axis of the shutter at 18b. The part 18a is associated with those exposure times which are obtained by co-operation of the shutter driving mechanism with an escapement, not shown in the drawing. In this case the cylinder jacket forming the stop assumes the position shown in FIG. 3, in which the peripheral flat 14a assumes such a position with reference to the movement path of the stop edge 7d of the shutter blade actuating lever 7 that the latter moves freely in its reverse direction without coming into contact with the stop.

If an extremely high shutter speed is set by means of the exposure time setting member 16 then the driving pin 17a of the setting lever 17 assumes a position in the cam track part 18b of the control cam 18, which transfers the stop 14 into a position as shown in FIG. 2. In this position of the stop the cylindrical jacket now assumes a position which is in the movement path 7d of the shutter blade actuating lever 7. During shutter action this part of the actuating lever strikes against the stop 14 immediately before the shutter blades 9, 10 have reached their open position, whereby the movement of the actuating lever 7 is limited so that an impulse accelerating the reversal movement is imparted to it.

As already indicated, the eccentric pin 15 serves as a carrier for the stop. This pin is provided with a cylindrical collar 15a which stands proud after being secured to the base plate 2. To permit the eccentric pin 15 to be pre-set, a flat 15b is milled on the collar 15a. By means of this shape of the collar 15a and with the aid of a spanner not shown in the drawing, the eccentric pin 15 is displaceable before the assembly of the stop into a position which it has to assume to obtain an accurate extremely short exposure time. The spanner to be used for adjusting the stop 14 for the above purpose must be formed internally to the shape of the cylindrical collar 15a and externally to the outer shape of the stop 14, so that after the actual adjustment which requires some force, the spanner is removed, and is replaced by fitting the stop on the eccentric pin 15. For location the stop 14 has a bore 14b formed therein, and the collar 15a of the eccentric pin 15 is provided with a guide pin 15a.

The adjustable eccentric pin 15 may also be used in shutters in which the shutter blades are reciprocated by means of an actuating ring adapted to be driven by a sliding crank drive. In this case a stop member, such as a projection or pin may be provided on the actuating ring, which stop member, when setting the shortest exposure time, strikes in the same manner as the stop edge 7d against the stop 14 during the shutter action, shortly before reaching the open shutter position. In these shutters the advantage of accurate adjustability is particularly useful, since the shutter blade actuating ring is in driving connection with the sliding pawl during the whole movement action.

We claim:

1. A photographic shutter having blades which are driven by an actuating member and which execute a reciprocating motion during exposure comprising a stop having an operating position for controlling the motion of said actuating member to assist in the reversal of said shutter blade motion, and a non-operating position, a carrier mounting said stop for movement between said operating and non-operating positions, said carrier including an eccentric pin having a collar with said stop rotatably mounted on said collar, a spanner-receiving surface being formed on said collar and means interconnecting said stop with an exposure time-setting member to move said stop into and out of said operating position.

2. A photographic shutter as recited in claim 1 characterized in that said stop is bell-shaped in form, with a flat on its outer surface and provided with a radially extending lever, said shutter having an exposure time setting member with a cam slot, and means interconnecting said cam slot with said lever to control its position.

3. A photographic shutter comprising a blade-activating member, blades which are driven by said blade-activating member through a reciprocating motion during exposure, exposure-controlling means including a stop movable between an operative position obstructing the path of said blade-activating member and an inoperative position out of the path of said blade-activating member, an exposure time-setting member for moving said stop between said opeartive and inoperative positions, and means adjustable to determine the operative position of said stop when said stop is moved into said operative position by said exposure time-setting member.

References Cited

UNITED STATES PATENTS 2,849,937  9/1958  Burger _____ 95—63

JOHN M. HORAN, Primary Examiner

U.S. Cl. X.R.

95—59, 62